US007427386B1

(12) United States Patent
Gregson et al.

(10) Patent No.: US 7,427,386 B1
(45) Date of Patent: Sep. 23, 2008

(54) PROCESSING MATERIALS

(75) Inventors: Paul Raymond Gregson, Preston (GB); Paul Gilchrist, Preston (GB); Terence Martin Cox, Preston (GB)

(73) Assignee: Nexia Solutions Ltd., Daresbury, Warrington (GB)

( * ) Notice: Subject to any disclaimer, the term of this patent is extended or adjusted under 35 U.S.C. 154(b) by 588 days.

(21) Appl. No.: 10/834,481

(22) Filed: Apr. 29, 2004

Related U.S. Application Data

(63) Continuation of application No. 09/869,754, filed as application No. PCT/GB00/00072 on Jan. 14, 2000, now abandoned.

(30) Foreign Application Priority Data

Jan. 15, 1999 (GB) ................................ 9900836.9

(51) Int. Cl.
*B01D 5/00* (2006.01)
(52) U.S. Cl. .................. 423/258; 423/259; 204/155; 95/28; 75/10.2; 75/398
(58) Field of Classification Search ................ 423/258, 423/259; 95/28; 204/155; 75/10.2, 398; 976/DIG. 277, DIG. 278, DIG. 280, DIG. 281; 376/310, 311
See application file for complete search history.

(56) References Cited

U.S. PATENT DOCUMENTS

| | | | |
|---|---|---|---|
| 3,806,579 A | | 4/1974 | Carles et al. |
| 3,939,354 A | * | 2/1976 | Janes ........................ 250/283 |
| 3,992,625 A | | 11/1976 | Schmidt et al. |
| 4,090,855 A | | 5/1978 | Hora et al. |
| 4,093,856 A | | 6/1978 | Stenzel |
| 4,167,668 A | | 9/1979 | Mourier |
| 4,208,582 A | | 6/1980 | Arnush et al. |
| 4,213,043 A | | 7/1980 | Dawson |
| 4,394,579 A | * | 7/1983 | Schwirzke ............... 250/423 P |
| 4,786,478 A | | 11/1988 | Ahmed et al. |
| 5,207,999 A | | 5/1993 | Burk et al. |
| 5,419,820 A | | 5/1995 | Horton et al. |
| 5,422,481 A | | 6/1995 | Louvet |
| 5,492,462 A | | 2/1996 | Kornilov et al. |
| 5,749,937 A | | 5/1998 | Detering et al. |
| 6,267,850 B1 | | 7/2001 | Bailey et al. |
| 6,323,455 B1 | | 11/2001 | Bailey et al. |

FOREIGN PATENT DOCUMENTS

| | | |
|---|---|---|
| DE | 3438 502 A1 | 4/1986 |
| EP | 0 180 094 A1 | 5/1986 |
| FR | 2 363 364 | 3/1978 |
| WO | WO 95/15921 A1 | 6/1995 |
| WO | WO 97/20620 A1 | 6/1997 |
| WO | WO 97/27595 A1 | 7/1997 |
| WO | WO 97/34684 A1 | 9/1997 |
| WO | WO 97/34685 A1 | 9/1997 |

OTHER PUBLICATIONS

Fathi Habashi, *Handbook of Extractive Metallurgy*, Wiley-VCH, Weinheim-NewYork, vol. III, 1997, Section 41.7.4.9, pp. 1627-1632, no month.
Abstract of Japanese Patent No. 19890210762, no date.
Abstract of Russian Patent No. 19960117830, no date.
Babaritskii, A.I., et al., *Experimental Study of a Beam-Plasma Discharge in Crossed Electric and Magnetic Fields*, vol. 4, No. 4, Jul.-Aug. 1978, pp. 842-849, Sov. J. Plasma Phys., abstract only.
Babaritskii, A.I., et al., Dokl. Akad. Nauk SSR (USSR), *A Beam-Plasma Discharge in Crossed Electric and Magnetic Fields*, vol. 237, No. 1-2, Nov. 1977, SSSR, pp. 68-70, Sov. Phys.—Dokl. (USA) vol. 22, No. 11, abstract only.
A. Conpant LaFontaine et al., *Study of Selective Heating at Ion Cyclotron Resonance for the Plasma Separation Process*, Phys. Plasmas vol. 2, No. 12, Dec. 1995, pp. 4641-4649.
P. Louvet, *Isotope Separation by Ionic Cyclotron Resonance*, Workshop on Separation Phenomena in Liquids and Gases, Darmstadt, Jul. 20-23, 1987.
A. Compant LaFontaine, *Ion Cyclotron Resonance Heating for the Plasma Separation Process*, 1994 American Institute of Physics. No month available.

* cited by examiner

*Primary Examiner*—Steven Bos
(74) *Attorney, Agent, or Firm*—Workman Nydegger

(57) ABSTRACT

The invention provides a series of techniques for processing uranium containing feed materials such as uranium ores, reprocessed uranium, uranium containing residues and uranium containing spent fuel. The processes described involve fluorination of uranium containing material, separation of the uranium containing material from other materials based on ionization thereof with the non-ionized fluorine containing material being recycled. Metallic uranium and/or plutonium and/or fission products may result. The technique offers advantages in terms of the range of materials which can be reprocessed and a reduction in the number of complexity of stages which are involved in the process.

14 Claims, 4 Drawing Sheets

PROCESSING MATERIALS

CROSS-REFERENCE TO RELATED APPLICATIONS

The present application is a continuation of U.S. patent application Ser. No. 09/869,754, filed Sep. 13, 2001 now abandoned, which claims priority to International Application No. PCT/GB00/00072, filed Jan. 14, 2000 which claims priority to United Kingdom Application No. 9900836.9, filed Jan. 1, 1999, which applications are incorporated herein by specific reference.

BACKGROUND OF THE INVENTION

1. The Field of the Invention

This invention concerns improvements in and relating to processing of materials, particularly, but not exclusively to the processing of nuclear fuel materials, materials involved in the nuclear fuel cycle and materials involved i the nuclear fuel industry.

2. The Relevant Technology

The production of fuel grade nuclear fuel is a long and complicated process. For instance, starting from mined uranium ore, in general terms the process involves taking the ex-mine grade material and gradually converting and enriching it until it is in a form and of a grade suitable for the production of fuel pellets.

Prior art systems for converting the ore into material suitable for enrichment, by physical or chemical means, have almost invariably involved a series of wet chemical techniques. For instance, the initial uranium oxide is concentrated in a uranyl nitrate hexahydrate based state; with a de-nitration stage to convert the material into $UO_3$; this is then reduced to convert the $UO_3$ to $UO_2$; with a hydro-fluorination stage to form $UF_4$ and further fluorination subsequently $UF_6$, which is fed to the enrichment procedures used.

Similar complex chemical and physical steps, generally involving wet chemistry, are used in the recycling of spent fuel and other uranium containing feeds.

BRIEF SUMMARY OF THE INVENTION

The present invention aims to provide an alternative route for converting a variety of uranium and other nuclear material containing feeds into a variety of products, including fuel grade materials.

According to a first aspect of the invention we provide a process for treating a uranium containing feed material, the process comprising:

contacting the uranium containing material with fluorine gas, the fluorine reacting with the uranium containing material to give uranium fluoride;

feeding the uranium fluoride to a separator stage, the separator stage converting the uranium fluoride into a plasma and/or ionized form, at least part of the uranium being ionized and at least part of the fluorine being non-ionized, the ionized parts being contained in a magnetic field to form a first product stream, the non-ionized parts being withdrawn from the magnetic field to form a second product stream;

The second product stream being recycled to the fluorine gas and uranium containing material contact stage.

The uranium containing feed material may be a uranium ore. The ore may be ex-mined and/or higher uranium content.

The uranium containing feed material may be uranium and/or uranium oxide from the reprocessing of uranium and/or uranium containing material previously used in the nuclear fuel cycle.

The uranium containing feed material may be uranium containing residues from one or more processes, for instance enrichment process streams, including waste or by-product streams thereof.

The uranium containing feed material may be spent fuel from a nuclear reactor. The spent fuel may contain fission products and/or plutonium isotopes, as well as uranium.

One or more of the above mentioned feed types may be fed to the process simultaneously.

The uranium fluoride produced may be mixed fluoride forms, but preferably the predominant uranium fluoride is uranium hexafluoride.

A material removal stage may be provided prior to the separator stage. Uranium fluoride, particularly uranium hexafluoride may be removed from the process at this stage. The uranium fluoride may be fed to an enrichment process and/or be stored and/or transported to a remote location and/or sold. Impurities may be removed from the process, particularly where the uranium containing feed material is uranium ore, at this stage. The impurities may be removed as fluorinated impurities.

The separator stage may be provided according to the details provided below.

The first product stream may comprise uranium metal. The uranium metal may be used to produce MAGNOX fuel. The uranium metal may be fed to a subsequent process, for instance an enrichment process. The enrichment process may be an AVLIS and/or other metal based enrichment process. The enrichment process may be provided according to the details provided below. The first product stream, particularly where a spent fuel feed is involved, may comprise uranium and/or plutonium and/or fission products is elemental form. The elemental form may be used as a storable form of the spent fuel material.

The second product stream is preferably predominantly fluorine. The fluorine may be in atomic form, but is preferably allowed to return to molecular form, $F_2$.

The second product stream may be processed prior to feeding to the fluorine/uranium containing material contact stage. The process may comprise cleaning the fluorine to remove other species. The level and/or amount of fluorine in the second product stream may be increased prior to feeding to the fluorine/uranium containing material contact stage from an external source. The external source may be provided according to the third aspect of the invention.

According to a second aspect of the invention we provide apparatus for treating a uranium containing feed material, the apparatus comprising:

a first unit in which the uranium containing material is contacted with fluorine gas, the fluorine reacting with the uranium containing material to give uranium fluoride;

a second unit forming a separator stage to which the uranium fluoride is fed, the separator stage including a plasma and/or ion generator to convert the uranium fluoride into a plasma and/or ionized form, at least part of the uranium being ionized and at least part of the fluorine being non-ionized, the separator stage further including magnetic field generating means to form a magnetic field to contain the ionized parts and form a first product stream, the separator stage still further including means for removing non-ionized parts from the magnetic field, the non-ionized parts being withdrawn from the magnetic field to form a second product stream;

the second product stream being recycled to the first unit in which the fluorine gas and uranium containing material are contacted.

According to a third aspect of the invention we provide a process for fluorinating a uranium containing feed material, the method comprising:

contacting the uranium containing material with fluorine gas, the fluorine reacting with the uranium containing material to give uranium fluoride;

the fluorine gas being produced by feeding a fluorine containing material to a separator stage, the separator stage converting the fluorine containing material into a plasma and/or ionized form, at least part of the non-fluorine part of the feed being ionized and at least part of the fluorine part of the feed being non-ionized, the ionized parts being contained in a magnetic field to form a first product stream, the non-ionized parts being withdrawn from the magnetic field to form a second product stream;

the second product stream being fed to the fluorine gas and uranium containing material contact stage.

The uranium containing feed material may be provided as defined in the first aspect of the invention. The uranium fluorides produced may be as defined in the first aspect of the invention.

The fluorine containing material may be a material from the nuclear fuel production process. Preferably the fluorine containing material is a uranium fluoride, and more preferably uranium hexafluoride. Ideally the uranium fluoride is depleted in $^{235}U$, and is still more preferably $UF_6$ which is depleted in $^{235}U$. The $UF_6$ may be a feed from another process and/or another part of the same process and/or a feed from a stored source of $UF_6$.

The first product stream preferably contains uranium, and in particular depleted uranium. The first product stream may be used as a storable form of depleted uranium.

Preferably the second product stream supplements fluorine being recycled from a separator according to the process of the first aspect of the invention.

According to a fourth aspect of the invention we provide apparatus for fluorinating a uranium containing feed material, the apparatus comprising:

a first unit in which the uranium containing material is contacted with fluorine gas, the fluorine reacting with the uranium containing material to give uranium fluoride;

a second unit forming a separator stage, the fluorine gas being produced in the separator stage by feeding a fluorine containing material to the separator stage, the separator stage including a plasma and/or ion generator to convert the fluorine containing material into a plasma and/or ionized form, at least part of the non-fluorine part of the feed being ionized and at least part of the fluorine part of the feed being non-ionized, the separator stage further including magnetic field generating means, the ionized parts being contained in a magnetic field produced by the magnetic field generating means, to form a first product stream, the separator stage still further including means to remove non-ionized part from the magnetic field, the non-ionized parts being withdrawn from the magnetic field to form a second product stream;

the second product stream being fed to the first unit in which fluorine gas and uranium containing material are contacted.

According to a fifth aspect of the invention we provide a process for enriching a uranium containing feed material, the process comprising:

introducing the uranium containing material to a separator stage, the separator stage converting the uranium containing material into a plasma and/or ionized form, at least part of the uranium being ionized and at least part of the non-uranium part of the feed being non-ionized, the ionized parts being contained in a magnetic field to form a first product stream, the non-ionized parts being withdrawn from the magnetic field to form a second product stream;

the first product stream being fed to an enrichment stage, the enrichment stage applying one or more frequencies of electromagnetic radiation to the first product stream, the one or more frequencies being chosen to selectively ionize one or more components of the first product stream, the selectively ionized components being separated from the selectively non-ionized components to form third and fourth product streams respectfully.

The uranium containing feed material may be provided according to the feed materials of the first aspect of the invention, but it is preferred that the uranium containing feed material be one or more uranium fluorides and in particular uranium hexafluoride.

The separator may be provided as detailed below.

Preferably the first product stream predominantly contains the uranium of the feed material. Preferably the second product stream predominantly contains the non-uranium part of the feed material and particularly the lower atomic mass components.

The first product stream, and particularly the uranium therein, may be fed to the enrichment stage in still ionized form. Preferably, however, the first product stream, and particularly the uranium therein, and still more particularly the $^{238}$uranium therein, is neutralized prior to the enrichment stage. The first product stream, and particularly the uranium therein, is preferably fed to the enrichment stage in gaseous and/or vapor form.

Preferably the one or more frequencies of electromagnetic radiation applied are selected to ionize the $^{235}U$ containing components in preference to the $^{238}U$ containing components.

The components may be molecules, such as $UF_6$, incorporating the respective isotopes of uranium, but are preferably the atomic form of the isotopes themselves.

The third product stream may be separated from the fourth product stream by electrostatically attracting the third product stream to a collection location. The fourth product stream is preferably collected at a separate location.

Preferably the third product stream is enhanced in one or more isotopes, ideally $^{235}U$, relative to the first product stream. Preferably the fourth product stream is depleted in the said one or more isotopes, ideally $^{235}U$, relative to the first product stream.

The third and/or fourth product streams may be subject to further processing.

According to a sixth aspect of the invention we provide apparatus for enriching a uranium containing feed material, the apparatus comprising:

a first unit, forming a separator stage, into which the uranium containing material is introduced, the separator stage including a plasma and/or ion generator to convert the uranium containing material into a plasma and/or ionized form, at least part of the uranium being ionized and at least part of the non-uranium part of the feed being non-ionized, the separator stage further including magnetic field generating means for producing a magnetic field, the ionized parts being contained in the magnetic field to form a first product stream, the separator stage still further including means to remove non-ionized parts from the magnetic field, the non-ionized parts being withdrawn from the magnetic field to form a second product stream;

a second unit, forming an enrichment stage to which the first product stream is fed, the enrichment stage including a source of electromagnetic radiation, preferably a laser, so as to apply one or more frequencies of electromagnetic radiation to the first product stream, the one or more frequencies being chosen to selectively ionize one or more components of the first product stream, the enrichment stage further including means to separate the selectively ionized components from the selectively non-ionized components to form third and fourth product streams respectfully.

According to a seventh aspect of the invention we provide a process for purifying a uranium containing material, the process comprising:

feeding a uranium containing material to an enrichment stage, the enrichment stage applying one or more frequencies of electromagnetic radiation to the feed thereto, the one or more frequencies being chosen to selectively ionize one or more components of the feed thereto, the selectively ionized components being separated from the selectively non-ionized components to form third and fourth product streams respectfully;

one or both of the product streams being fed to a fluorinating stage in which the uranium containing material in the product stream is contacted with fluorine gas, the fluorine reacting with the uranium containing material to give uranium fluoride;

the fluorinated uranium and other components of the product stream being fed to a separation stage in which the uranium fluoride is separated, to give a fifth product stream, from one or more other components of the product stream which forms a sixth product stream.

Preferably the uranium containing material fed to the enrichment stage is atomic uranium, preferably in gaseous and/or vapor form, preferably in non-ionized form.

Preferably the enrichment stage enriches the material fed to it in the manner of the fifth aspect of the invention detailed above.

The fourth product stream may be fed to the fluorinating stage, but it is particularly preferred that the third product stream is so fed.

Preferably the uranium fluoride produced is as detailed in the first aspect of the invention above.

The other components of the product stream may be one or more other metals, and in particular may be iron. Preferably the iron is also fluorinated in the fluorination stage.

The uranium fluoride may be separated from the one or more impurities, preferably also in fluoride form, based on differences in volatility, and most preferably the higher volatility of the uranium fluoride, ideally uranium hexafluoride. The fifth and/or sixth product streams may be subjected to further processing.

According to an eighth aspect of the invention we provide apparatus for purifying a uranium containing material, the apparatus comprising:

a first unit forming an enrichment stage to which a uranium containing material is fed, the enrichment stage including a source of electromagnetic radiation, preferably a laser, to apply one or more frequencies of electromagnetic radiation to the feed thereto, the one or more frequencies being chosen to selectively ionize one or more components of the feed thereto, the enrichment stage further including means to separate the selectively ionized components from the selectively non-ionized components to form third and fourth product streams respectfully;

a second unit forming a fluorinating stage, to which one or both of the product streams are fed in which the uranium containing material in the product stream is contacted with fluorine gas, the fluorine reacting with the uranium containing material to give uranium fluoride;

a third unit forming a separation stage, the fluorinated uranium and other components of the product stream being fed to the separation stage in which the uranium fluoride is separated, to give a fifth product stream, from one or more other components of the product stream which forms a sixth product stream.

The various aspects of the invention detailed above may be combined with one another. For example the fluorine production process of the third aspect of the invention may be used to contribute to the fluorine requirements of the fluorinating stage of the first aspect of the invention. Similarly the fluorine production process of the third aspect of the invention may be used to contribute to the fluorine requirements of the fluorinating stage of the seventh aspect of the invention. It is also possible for the separator of the first aspect of the invention and the fifth aspect of the invention to be one and the same, with the first product stream from the separator going to the enrichment stage. This combined process could also use the third aspect of the invention to contribute to its fluorine requirements in the fluorinating stage. Additionally it is also possible, with or without the separator of the first aspect as the separator of the fifth aspect too, for the enrichment stage of the fifth aspect to be one and the same as the enrichment stage of the seventh aspect of the invention. The first, third, fifth and seventh aspects of the invention may all form a single process.

The feed may be introduced to the magnetic field as a gas, liquid, solid or mixture of states. A gas feed to the magnetic field is preferred.

The feed may be introduced to the plasma generation means as a gas, liquid, solid or mixture of states.

The feed may be introduced to the ionization means as a gas, liquid, solid or mixture of states. A gas feed to the ionization means is preferred, particularly where a plasma generator is not also provided.

The feed may be provided in gaseous form by boiling and/or evaporation and/or sublimation of a solid or liquid initial feed. The conversion to gaseous state may be effected by a furnace, microwave heater or other form of heater means. Preferably the gas is introduced prior to ionization.

Preferably all, or substantially all, of a given component is ionized. Preferably all, or substantially all, of a given component is not ionized.

Preferably some or all metallic elements present in said feed are ionized. The ionization of metallic elements with an atomic weight greater than 90 is particularly preferred. Preferably some or all non-metallic elements in said feed are not ionized. Preferably all elements with an atomic weight below 90, most preferably below 70 and ideally below 60, are left in non-ionized form. It is particularly preferred that elements such as uranium and/or plutonium and/or thorium and/or gadolinium are ionized. It is preferred that elements such as hydrogen and/or fluorine and/or oxygen and/or nitrogen are not ionized. Preferably boron is not ionized. Preferably fission products are not ionized.

The ionization of the components may be caused by the temperature of the plasma. Additionally or alternatively the ionization of the components may be caused by the interaction of the components with high energy electrons produced by electron cyclotron resonance.

The extent of ionization and/or components ionized may be controlled by the energy input of and/or residence time in the electron cyclotron resonance unit.

Preferably the ionization is controlled by the level of energy input. The level of energy input may be controlled by controlling the temperature of the plasma. Preferably the energy input is not selective between components of the feed. In this way all of the components of the feed are preferably raised to the same energy level. Preferably the ionized and non-ionized feed components are in equilibrium with one another for the prevailing conditions.

The feed material may be converted to a gas and fed to an ECR unit for ionization. A furnace heater or evaporator may be used to convert the solid or liquid feed to gaseous/vapor form.

In a particular embodiment, therefore, the plasma may convert the feed materials to discrete atoms and electron cyclotron resonance may subsequently give rise to at least partial ionization, preferably of a selective nature.

Preferably the feed is provided in molecular form and selectively separated as discrete atoms and/or elemental forms from ionized discrete atomic forms and/or elemental forms. This renders the technique applicable to a wider variety of materials than are possible with elemental feed and separation in elemental form or molecular feed followed by separation in molecular form.

The temperature of said plasma may be controlled to provide selective ionization of the components in the desired way. Thus the plasma may ionize some components in the feed but leave other components, such as fission products and/or non-metallic elements, un-ionized.

Preferably said plasma is provided at 3000 to 4500K. Preferably said plasma is generated by microwave or radio frequency means. Preferably the plasma in the generator is operated at between 1000 and 10000 Pa. A value of 2000 ±10% is preferred.

Additionally or alternatively the residence time of the feed within the plasma prior to the separation may be controlled to provide selective ionization of the components in the desired way.

Preferably the feed is introduced into the containing magnetic field in un-ionized form. Preferably the partial ionization process occurs within the magnetic field on an uncharged gas. The gas may be in molecular and/or atomic form.

The magnetic field may be configured to define a cylindrical active volume in which the plasma/ions are processed. Preferably the plasma/ions pass along the axis of this containment area from the plasma generation and/or ionization means to the next, separation, stage.

Preferably the separation of ionized and un-ionized components is affected by removing the un-ionized component from the plasma, most preferably as a gas. The un-ionized components may be pumped away from the ionized component. The ionized component is contained and hence restrained by the magnetic field.

The separation of ionized from non-ionized components may be effected in a number of stages. Preferably the stages are discrete from one another. The stages maybe separated from one another by a baffle provided with an aperture. Preferably the aperture is entirely within the containment area of the magnetic field. Preferably one or more of the stages are operated at different pressures to one or more other stages. The pressure level may be maintained by the pumping level employed. Preferably the pressure in one or more stages near to the inlet is higher than one or more further away from the inlet. Preferably the pressure decreases for each zone relative to the preceding stage nearer the inlet. Preferably the pressure in each stage is 30% to 60% of that in the preceding stage, progressing away from the inlet.

Preferably three stages are provided. Each stage may be between 0.5 and 2 m in length.

Preferably the first stage is operated at between 10 and 50 Pa. A level of 40 Pa ±10% is preferred.

Preferably the second stage is operated at between 5 and 20 Pa. A level of 16 Pa ±10% is preferred.

Preferably the third stage is operated at between 2 and 10 Pa. A level of 7 Pa ±10% is preferred.

The separated un-charged components may be recycled for subsequent use and/or subjected to further processing. This may include further selective ionization and/or selective processing to separate different components.

The separated charged components are preferably still contained in a magnetic field. The separated charged components may be subjected to further processing including selective de-ionizing; de-ionizing followed by further selective ionization; or other selective processing to separate different components.

The enrichment stage referred to in the above mentioned aspects may have one or more of the following features.

The enrichment stage may be evacuated, for instance to $10^{-6}$ torr or less.

The electromagnetic radiation may be applied by one or more laser beams and/or one or more lasers. Preferably the selective ionization generated is photoionization. Ionization and/or excitation may occur in one or more stages, preferably with different frequencies selected for different stages.

The separation of ionized and non-ionized components may be effected by electrostatic attraction of the ionized species to a collection location, such as one or more collection plates. More preferably the ionized and non-ionized components are separated by deflecting the ionized components using a magnetic field.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

Figure 1:
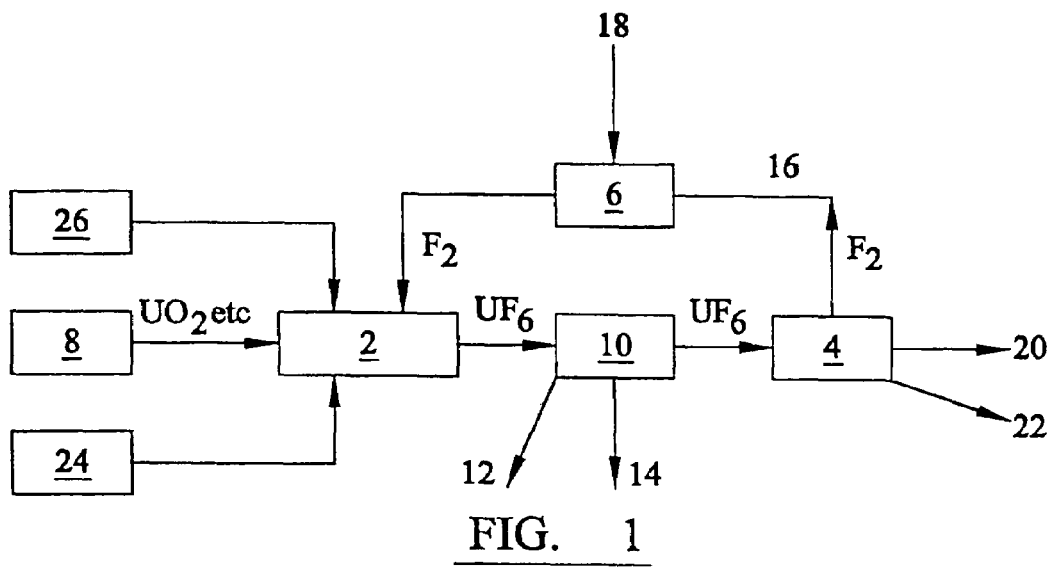
FIG. 1 illustrates a first embodiment of the invention for producing purified uranium containing materials.

FIG. 1 illustrates a direct fluorination stage 2 in which the metallic components of interest are fluorinated followed by a fluorine/metal separation stage 4 to give rise to a variety of potential product forms and fluorine which is recycled through stage 6 back to the direct fluorination stage. This system can be used for a variety of potential feeds with a variety of intended product forms.

Uranium Ore Concentrate Feed

The process offers the potential for feeding uranium ore concentrate from stage 8 into the direct fluorination stage 2 where the uranium oxide is converted to uranium fluoride, principally $UF_6$, by the introduction of fluorine. The $UF_6$ then passes to a cleaning stage 10 at which point a variety of impurities present in the ore concentrate can be removed, in various forms, again including principally fluorinated forms. These form waste stream 12. It is also possible at this stage to tap from the process $UF_6$ for sale or use in other processes, product stream 14.

As part of the intended process, however, a substantial portion of $UF_6$ continues from cleaning stage 10 to separation stage 4. In the separation stage 4, which is discussed in more detail below, the uranium and other metal species are separated from the fluorine and other low atomic weight materials. The fluorine returns as stream 16 to stage 6 for subsequent feed back to the direct fluorination stage 2. The level of fluorine in the system can be topped up from a fluorine source 18 which feeds to stage 6 also.

It is a major advantage of the present technique that the expensive fluorine is used for the separation of uranium from other impurities in the ore, but that the fluorine is recovered and recycled back to the fluorination stage 2 for subsequent re-use. A substantially closed circuit with regard to the fluorine is thus provided.

The metallic product stream from stage 4 may form product stream 20 to subsequent processing, discussed in more detail below, or alternatively may form a uranium metal product stream 22, for instance for use as a magnox fuel.

Re-processed Uranium Feed

The system outlined above with reference to FIG. 1, can equally well be used with a feed from stage 24 consisting of re-processed uranium, predominantly $UO_3$. The re-processed uranium is obtained from a variety of potential sources, including uranium extracted from spent fuel rods.

Once again, the uranium oxide is fed to a direct fluorination stage for conversion to $UF_6$. Once again, it will be possible to remove a product stream 14 consisting of $UF_6$, the uranium being re-processed uranium.

The impurity removing stage 10 may or may not be necessary for re-processed uranium feed.

Once again, in separation stage 4 the uranium is split from the fluorine with the fluorine being recycled. The uranium then either passes to further processing, for instance to enrich it, or alternatively is used for the production of magnox fuel.

Uranic Residue Feeds

A variety of existing processes linked to the production of uranium fuels produce residue streams which require processing. These streams generally consist of uranium in oxide form and as a consequence, such streams 26 are adapted to feeding to the fluorination stage 2 in the process outlined above. Once again, the uranium can be extracted for subsequent further processing as desired.

Fluorine Replenishment Route

Particularly with regard to the processing of uranium ore concentrates, where fluorinated impurities are removed from the process in stage 10, it is necessary to add fluorine to the circuit to replace the fluorine which is lost with these impurities. The fluorine can come from a variety of sources, but a preferred production route is outlined in FIG. 2.

Figure 2:
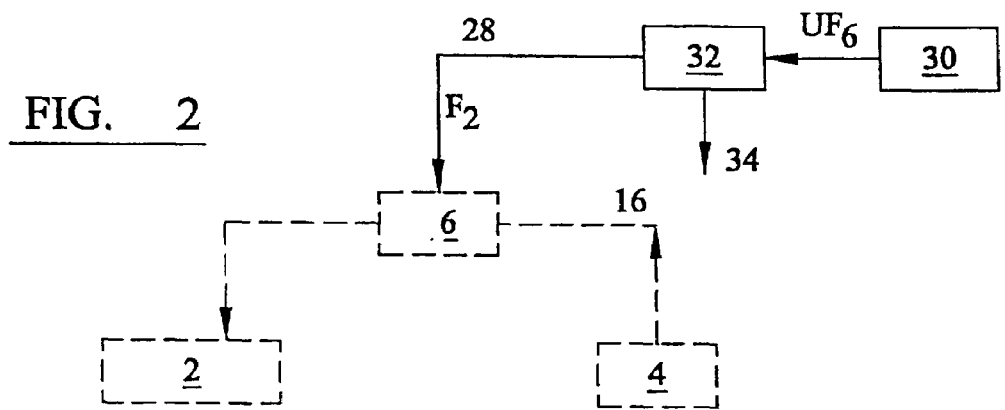
FIG. 2 illustrates a modification to the process of FIG. 1 for introducing fluorine to the circuit.

FIG. 2 illustrates the fluorine source stage 6 to which fluorine is fed from the separation stage as stream 16 and is fed back to the fluorination stage 2. The top up fluorine is introduced into this stage 6 from stream 28.

The feed stage 30 for this part of the process provides a source of $UF_6$ and it is particularly preferred that this be the depleted stream of $UF_6$ arising from the existing enrichment techniques and/or stockpiles of depleted $UF_6$ historically produced. Depleted $UF_6$ generally consists predominantly of $^{238}UF_6$ from which the vast majority of $^{235}UF_6$ has been removed in enrichment processes.

The $UF_6$ feed from stage 30 is fed to separation stage 32, which is preferably of a similar type to the separation stage 4 outlined above in FIG. 1, and discussed below in more detail.

The separation stage 32 produces the desired stream of fluorine, 28, to feed into the fluorine circuit and separate product stream 34. Preferably the product stream 34 is uranium metal which is a more suitable form for long term storage than $UF_6$. This is particularly so where the metal is depleted uranium, predominantly in $^{238}U$ form.

Spent Fuel Feed

Figure 3:
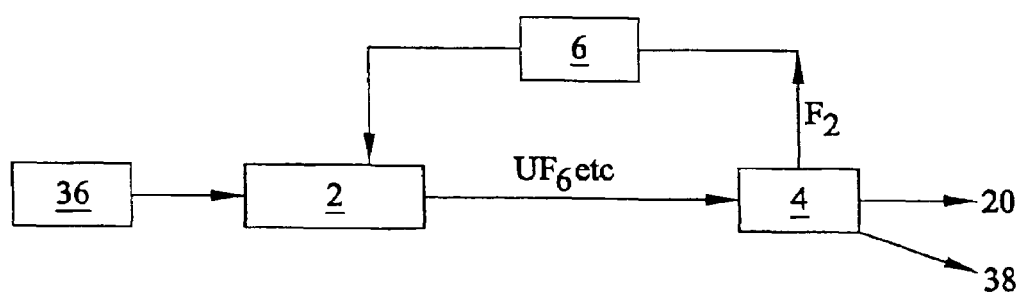
FIG. 3 illustrates a modified circuit for processing spent fuel materials.

A variation on the technique, for addressing spent fuel feed materials, is outlined in FIG. 3.

Spent fuel, generally comprising of uranium oxide, fission products and plutonium oxides, is introduced at stage 36 and forms the feed to a direct fluorination stage 2. The $UF_6$ produced and other fluorinated metals are then fed to the separation stage 4.

Given the nature of the feed materials and the desired product forms, impurities are not generally removed from this process route.

As before, the fluorine is recycled back from stage 4 to the direct fluorination stage 2 through stage 6. The products pass on from stage 4 for subsequent handling. The products may form a feed 20 to a subsequent processing stage, or alternatively may form a product form in themselves, stream 38.

A particularly preferred product stream 38 is a mixture of uranium, plutonium and fission products all in metallic form. This product form is intended for long term storage and represents a considerably improved storage form compared with the material still within a fuel rod or fuel assembly. Not only is the actual form in which the material is present improved, but also the volume of that material is reduced by a factor of 2.5 or so compared with its volume in the actual assembly and additionally the volume of the assembly itself is removed from needing storage. An overall reduction factor of 20 or so in the volume which needs to be stored can be achieved as a result. Another beneficial property of this product form for storage is that uranium metal is a good gamma shield, and as a consequence the material has a self-shielding function against the gamma emissions arising from the fission products contained therein.

Treatment of Enriched Product

Figure 4:
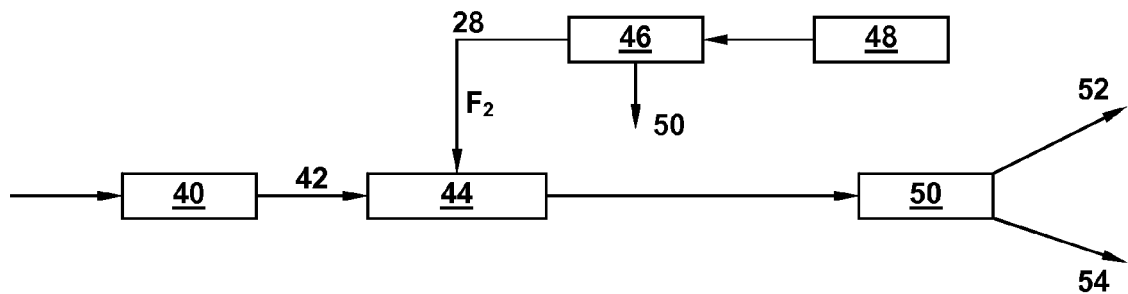
FIG. 4 illustrates a further embodiment of the invention.

As illustrated in FIG. 4, a number of enrichment processes, stage 40, including AVLIS, stage 40 provide enriched forms of uranium in metallic or oxide form. This stream 42 frequently contains iron or other impurities which it is desirable to remove before further processing of the uranium occurs.

In the process route illustrated in FIG. 4 the uranium and iron containing stream 42 is fed to a direct fluorination stage 44, the fluorine for which is fed from source stage 46.

It is particularly preferred that the source stage 46 be a separator of the general type outlined in FIG. 1 above as separator stage 4, and/or in FIG. 2 above as separator stage 32. Once again, it is particularly preferred that the feed material 48 to this stage comprise $UF_6$ tails and particularly depleted $UF_6$. Again, as well as the useful fluorine feed to the fluorination stage 44, a more readily storable and/or handleable product form 50 is produced.

The uranium hexafluoride, iron fluoride and other fluorides produced in the direct fluorination stage can be separated in separator stage 50 based on their differing volatilities. Thus, the relatively volatile $UF_6$ can be removed as a product stream 52 for subsequent further processing, for instance fabrication, whereas the iron fluoride impurity can be removed as a product stream 54 for subsequent disposal.

Separator Stage

Figure 5:
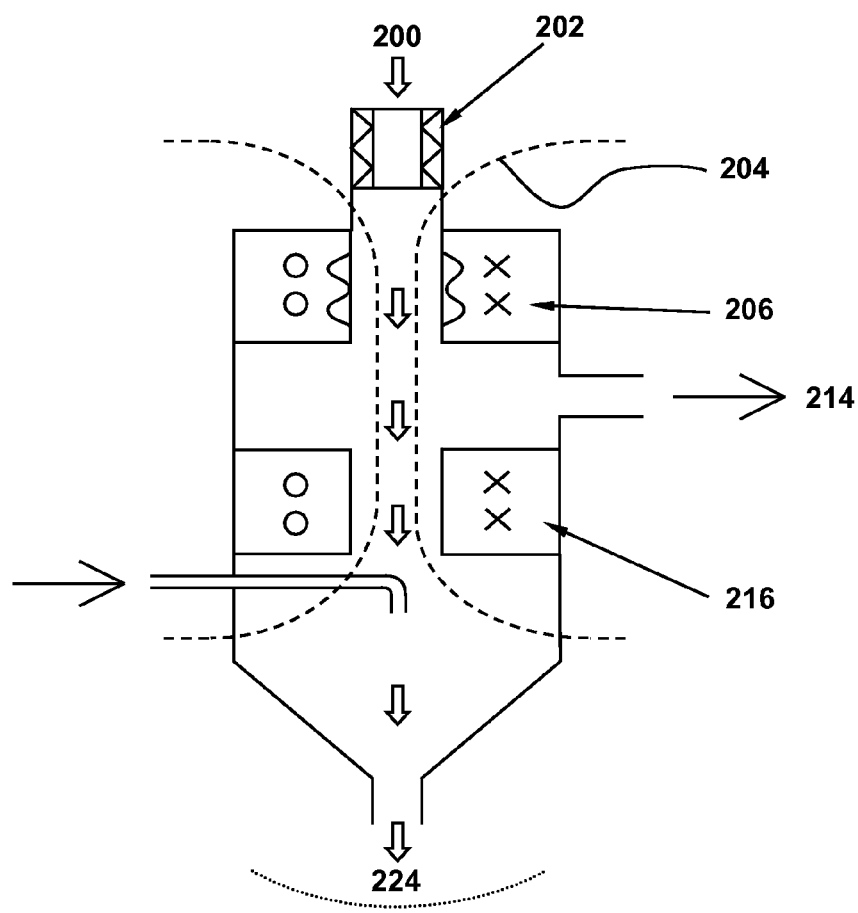
FIG. 5 illustrates one embodiment of a separator stage suitable for use in the process routes of the invention.

A suitable separator stage, suitable for use in the various embodiments of the present invention is illustrated in FIG. 5.

The feed stream 200 passes through a plasma generator 202 which rapidly heats the feed material to around 4000K. The plasma generator 202 may be a microwave or RF type plasma generator and the control of the plasma temperature can readily be provided in this way.

Conducting solenoids in array 206 and 216 produce a high intensity magnetic field whose lines of force are schematically represented 204. The plasma generator and magnetic field are configured such that the components of the feed which are ionized are already within the confines of the magnetic field. The conducting solenoids are set to produce a field intensity in excess of 0.1 Tesla.

As a consequence of the highly elevated temperature of the feed stream 200 following its passage through the plasma generator 202, the components of the feed stream 200 break down into their component atoms. This facilitates processing of the feed material according to its individual atomic make up rather than needing an elemental feed or processing the feed only according to differences between the molecules.

At the temperature of the plasma, uranium atoms and other high atomic mass components become charged, U+ for instance. The lower atomic mass components, however, principally fluorine in this case, remains uncharged. Both the ionized and uncharged species are in gaseous form.

By virtue of their charge, the uranium ions are contained by the magnetic field and pass onward through the array of solenoids to form product stream 224. The uncharged nature of the fluorine atoms, however, allows them to move freely and unfettered by the magnetic field, and as a consequence they can be removed as process stream 214 by vacuum pumps or other suitable means. Once clear of the uranium ions, the fluorine can be allowed to fall back in energy and so recombine as $F_2$.

As a consequence of this separating stage, therefore, the uranium has been separated from the low atomic weight elements in the feed liquor and the uranium can be sent for subsequent processing or use.

The nature of the selective ionization which occurs within the separator is important. The ionization occurs as a result of the overall energy level of the system. Thus, the species which are ionized under the prevailing conditions and the species which are not are determined by the equilibrium state for those species under those conditions. The selective ionization contained, therefore, is stable and long lasting so allowing the separation to be carried out effectively without pressure of time.

If the energy is introduced into the system such that it is selectively taken up by one species rather than one or another species, then the selective ionization which is obtained is less useful. In this situation, collisions between the ionized and non-ionized species would result in energy transfer and hence a potential change in the state and/or charge of that species. This places a substantial time pressure on the speed of any separation which must be informed as otherwise the selectivity is lost. Additionally, such ionizations need to be carried out at low densities of material as otherwise collisions become too dominant for selectivity to occur.

The equilibrium state outlined for the present invention, however, can allow collisions between species to occur without any detriment to the selectivity of the process. As a consequence, a far higher throughput of material is possible.

Figure 6:
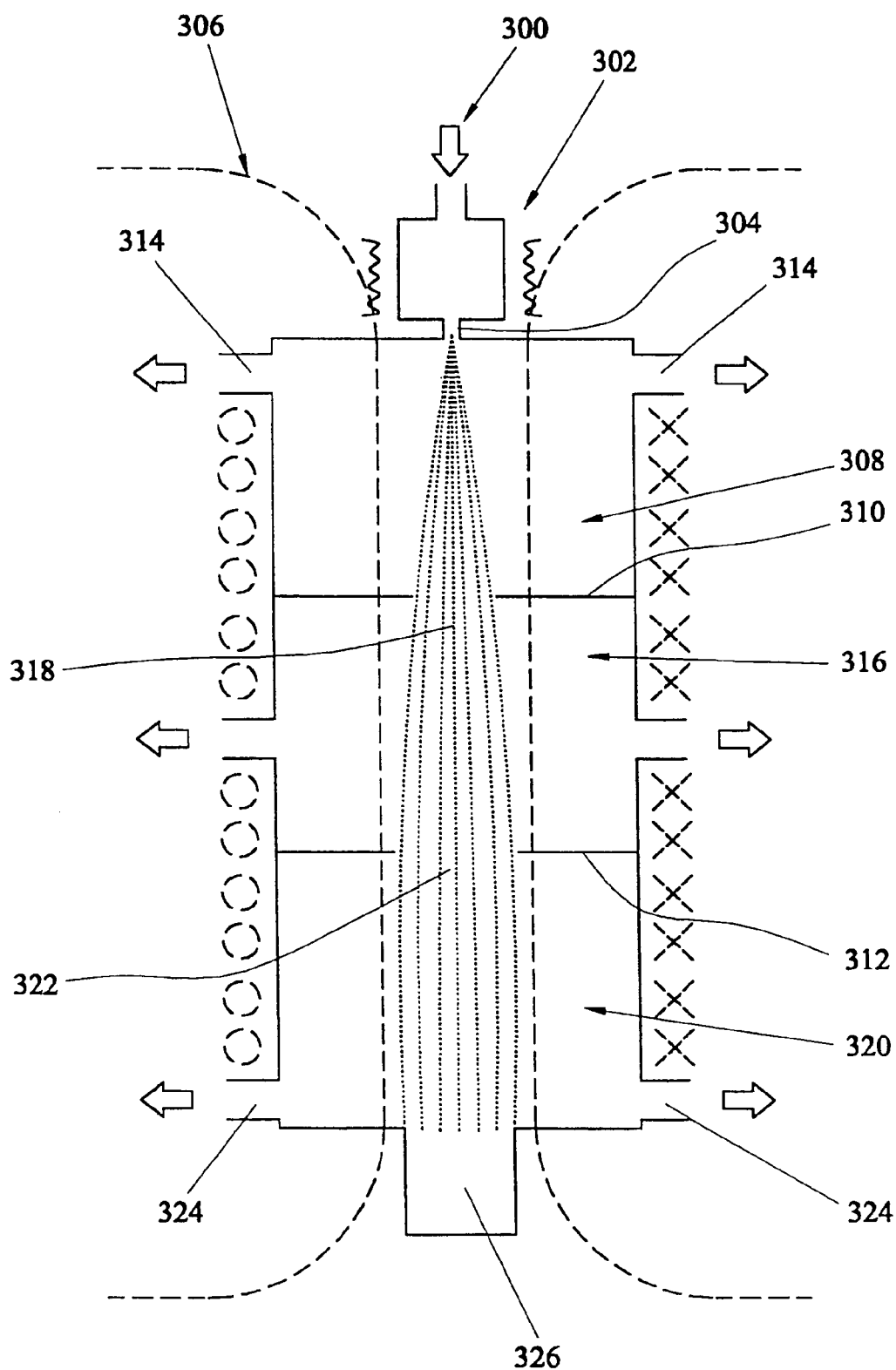
FIG. 6 illustrates an alternative embodiment of a separator suitable for use in the process routes of the invention.

An alternative separator which can be used is illustrated in FIG. 6. Once again, the description of the device will be made in relation to separating uranium from uranium hexafluoride feed, but other applications can readily be made for this apparatus.

The uranium hexafluoride feed liquor is introduced in stream (300) as a vapor. The feed is rapidly converted to a plasma by a radio frequency plasma generator (302). The plasma generator operates at 2 KPa in order to ensure essentially equilibrium ionization levels for the desired components of the feed due to high levels of collisions.

Contact parts within the plasma generator may be formed from ceramic fluorides in order to give the necessary physical properties to withstand the conditions involved. The system may employ copper surface which is cooled by contact with water containing tubes. The water flow is used to lower the temperature of the copper walls and gives rise to condensation of the uranium fluoride forms on the walls. This chemically and thermally insulates the copper. Eventually an equilibrium state develops with a given thickness of the uranium fluoride deposited on the wall. A self-lining effect is thus provided.

The plasma generated exits the generator (302) through nozzle (304) and is contained by magnetic field, schematically illustrated (306). An approximately 30 mm radius nozzle is used to maintain the pressure within the plasma generator (304) and to give the desired flow rate.

On leaving the plasma generator and entering zone 1 (308) the plasma will expand giving rise to cooling. However, the work done against the magnetic field by the uranium ions will result in partial re-heating. If appropriate additional energy can be introduced into the plasma during its subsequent progress through the apparatus to maintain the temperature at a level on which the desired components remain ionized. This energy may be provided by radio frequency means. The desired selectivity based on an equilibrium is thus maintained.

The beam of material leaving the plasma generator tends to fan out as the distance from the plasma generator increases.

The barriers (310, 312) defining the various zones take this expansion into account in their selected aperture diameters.

The containing field is approximately 0.1 tesla in strength. Such levels can be provided by conventional electro magnetics although super conducting magnets may be employed. A magnetic field of this strength confines the uranium ions to a radius of 180 mm or so following a travel distance of 3 m from the nozzle. The zones/stages are each 1 m in length. The radius of the expanding beam is approximately proportional to the fourth route of the distance traveled.

Within zone 1 (308) outlets (314) to a vacuum pump, not shown, are provided. These allow first waste streams to be drawn off from the apparatus, the waste streams comprising non-charged material, principally fluorine. Aluminum may be used for the waste stream lines.

The pressure in zone 1 is around 13 Pa and during its travel through that zone the fluorine pressure in the material beam reduces substantially to that pressure. The excess fluorine over this is pumped off through outlets (314) using commercially available pumps.

The reduced fluorine content beam then passes into zone 2 (316) through the gap (318) in barrier (310).

The second zone (318) is operated at a lower pressure than the first, approximately 5 Pa and once again the fluorine content in the beam reduces towards this pressure as the material passes through the zone.

The beam then passes into zone 3 (320) through gap (322) in barrier (312).

This zone is again operated at a still lower pressure, approximately 2 Pa, with the excess fluorine being pumped off through outlets (324).

The significantly depleted fluorine beam then passes on to outlet (326) for subsequent handling.

The ionized, gaseous uranium may be contacted with a grid of some description to discharge the charge and reduce the energy of the uranium to a state in which it solid or liquid. The introduction of chemical materials to effect a quenching and/or cooling action may be considered. In this regard the use of inert gases to cool the uranium may be preferred so that a chemical combination with the gases does not occur. Metallic uranium arises as a result. The uranium may be cooled sufficiently to provide it as a solid or alternatively may only be partially cooled to leave it in liquid form.

The fluorine remaining in the uranium product stream (326) may be readily volatized, as a uranium fluoride, from the bulk of the uranium product and recycled. When the uranium is collected as a liquid the separation may conveniently be carried out in situ. The volatized UF will largely be converted to $UF_6$ which can be recycled.

Provision for collecting fluorine released from the liquid by off gassing may be provided.

For a 12 kg uranium per hour feed a 5.7 kg/hr fluorine feed arises. Of this fluorine 3.6 kg/hr is expected to be pumped off from zone 1; 1.3 kg/hr pumped off from zone 2; 0.5 kg/hr pumped off from zone 3; and 0.3 kg/hr to remain in the uranium product stream (326). Off gassing of the fluorine from this product as $UF_3$ and/or $UF_4$ results in a very pure uranium product, i.e., a fluorine content in the parts per million range.

Uranium Enrichment Stage

Enrichment of uranium, to increase the portion of $^{235}U$, may be effected through a variety of techniques. For instance, the $UF_6$ produced by the direct fluorination stage 2 of FIG. 1 may be removed from the process at stage 10 and be feed to an integral enrichment process and/or an enrichment process at a remote location following transportation. The enrichment process may be based on gas centrifuging and/or gaseous diffusion separation and/or thermal diffusion based separation.

It is preferred, however, that the uranium exiting separator stage 4 be fed as product stream 20 direct to a subsequent enrichment stage.

Figure 7:
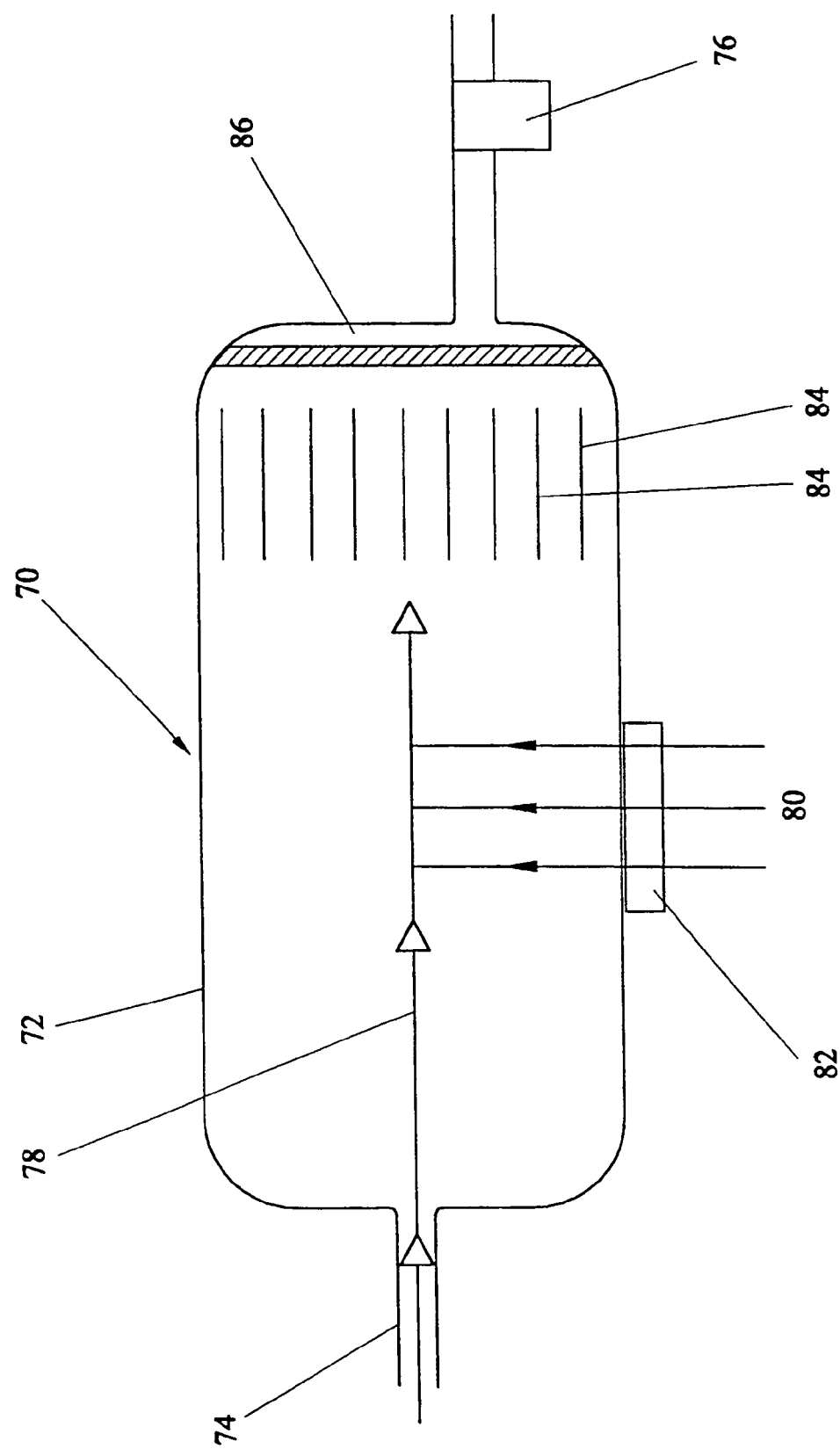
FIG. 7 illustrates an enricher suitable for use in the process routes of the present invention.

AVLIS, atomic vapor laser isotope separation, offers a particularly preferable form of enrichment. An AVLIS type enricher rendered suitable for use in the present invention is illustrated in FIG. 7. The enricher 70 consists of a vessel 72 into which a feed stream is introduced along passage 74. The vessel 72 is evacuated using pump 76 to a low pressure, generally less than $10^{-6}$ torr.

Where the enricher 70 follows a separator 4, as illustrated in FIG. 1 or 3, then the feed is generally uranium metal in atomic vapor form.

Where the enricher 70 is followed by a direct fluorination stage 44, as illustrated in FIG. 4, then the feed may be atomic vapor from a previous stage (such as a separator of the above mentioned type) or the enricher may be provided with capability to convert the feed into an atomic vapor form. This facility may be provided (not shown) by inductive heating and/or resistive heating and/or electron beam application.

Once introduced into the vessel 72 the feed stream 78 contacts laser radiation 80 introduced from a laser through window 82 in the vessel 72. The frequency or frequencies of the radiation are carefully selected such that they cause photoionization of one set of isotopes, but not of the other set of isotopes. In the case of uranium, the frequency is generally selected to excite $^{235}U$, but not $^{238}U$.

Once converted to an ionized form, the ions are electrostatically attracted to collection plates 84. The enriched material collected can be periodically or continuously removed from the collector plates 84. The non-ionized forms are not attracted to the charges plates 84 and hence continue to separate collector 86.

The enriched material collected at plates 84 normally contains other components too, such as iron and iron oxides and these are removed based on volatility as discussed above in relation to FIG. 4. A similar separation technique may be used to remove impurities from the depleted material collected by collector 86.

What is claimed is:

1. A process for enriching a uranium containing feed material, the process comprising:

contacting the uranium containing feed material with fluorine gas in a fluorine gas and uranium containing feed material contact stage, the fluorine gas reacting with the uranium containing feed material to give uranium fluoride;

introducing the uranium fluoride to a separator stage, the separator stage converting the uranium fluoride into a plasma and/or ionized form, at least part of the uranium being ionized and at least part of the fluorine gas being non-ionized, the ionized part being contained in a magnetic field to form a first product stream, the non-ionized part being withdrawn from the magnetic field to form a second product stream;

feeding the first product stream to an enrichment stage, the enrichment stage applying one or more frequencies of electromagnetic radiation to the first product stream, the one or more frequencies being chosen to selectively ionize one or more components of the first product stream to give selectively ionized components and selectively non-ionized components, the selectively ionized components being separated from the selectively non-ionized components to form third and fourth product streams, respectively; and recycling the second product stream to the fluorine gas and uranium containing feed material contact stage.

2. A process according to claim 1 in which the uranium containing feed material is a uranium ore.

3. A process according to claim 1 in which the uranium containing feed material is uranium and/or uranium oxide from the reprocessing of uranium and/or uranium containing material previously used in the nuclear fuel cycle.

4. A process according to claim 1 in which a material removal stage is provided prior to the separator stage with one or more uranium fluoride forms being removed from the process at the material removal stage.

5. A process according to claim 1 in which the first product stream comprises uranium metal.

6. A process according to claim 1 in which the first product stream comprises uranium and/or plutonium and/or fission products in elemental form.

7. A process according to claim 1 in which the second product stream is predominantly fluorine.

8. A process according to claim 1 in which the second product stream is processed prior to feeding to the fluorine gas and uranium containing feed material contact stage, the process comprises cleaning the fluorine to remove other species.

9. A process according to claim 1 in which the uranium containing feed material is one or more uranium fluorides.

10. A process according to claim 1 in which the uranium containing feed material comprises uranium hexafluoride.

11. A process according to claim 1 in which the first product stream is neutralized prior to feeding to the enrichment stage.

12. A process according to claim 1 in which the one or more frequencies of electromagnetic radiation applied are selected to ionize the $^{235}$U containing components in preference to the $^{238}$U containing components.

13. A process according to claim 1 in which the third product stream is separated from the fourth product stream by electrostatically attracting the third product stream to a collection location.

14. A process according to claim 1 in which the third product stream is enhanced in $^{235}$U relative to the first product stream.

* * * * *